United States Patent
Maleki et al.

(10) Patent No.: US 12,549,310 B2
(45) Date of Patent: Feb. 10, 2026

(54) METHODS OF PROVISION OF CSI-RS FOR MOBILITY TO IDLE USER EQUIPMENTS

(71) Applicant: Telefonaktiebolaget LM Ericsson (publ), Stockholm (SE)

(72) Inventors: Sina Maleki, Malmö (SE); Andres Reial, Höllviken (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 363 days.

(21) Appl. No.: 18/031,824

(22) PCT Filed: Oct. 11, 2021

(86) PCT No.: PCT/SE2021/050993
§ 371 (c)(1),
(2) Date: Apr. 13, 2023

(87) PCT Pub. No.: WO2022/081067
PCT Pub. Date: Apr. 21, 2022

(65) Prior Publication Data
US 2023/0388077 A1 Nov. 30, 2023

Related U.S. Application Data

(60) Provisional application No. 63/092,880, filed on Oct. 16, 2020.

(51) Int. Cl.
| | | |
|---|---|---|
| *H04W 4/00* | (2018.01) | |
| *H04L 5/00* | (2006.01) | |
| *H04W 48/10* | (2009.01) | |
| *H04W 76/27* | (2018.01) | |

(52) U.S. Cl.
CPC .......... *H04L 5/0051* (2013.01); *H04W 48/10* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2013/0044665 A1 | 2/2013 | Ng et al. | |
| 2018/0262313 A1* | 9/2018 | Nam | H04L 5/0044 |
| 2020/0154501 A1* | 5/2020 | Cheng | H04W 4/70 |

OTHER PUBLICATIONS

3GPP TS 38.214 V16.2.0 (Jun. 2020), 3rd Generation Partnership Project; Technical Specification Group Radio Access Network; NR; Physical layer procedures for data (Release 16) 163 pages.
International Search Report and Written Opinion of the International Searching Authority, PCT/SE2021/050993, mailed Feb. 10, 2022, 15 pages.

(Continued)

*Primary Examiner* — Zewdu A Beyen
(74) *Attorney, Agent, or Firm* — Sage Patent Group

(57) ABSTRACT

A method by a network node to provide connected mode channel state information-reference signal, CSI-RS, for mobility to an user equipment, UE, while in idle mode includes providing the UE with an indication that CSI-RS for mobility occasions are available in idle mode based on determining that the UE is transitioning into idle or mode or is in idle mode. The method includes transmitting a CSI-RS for mobility occasion to the UE while the UE is in idle mode.

18 Claims, 12 Drawing Sheets

(56) References Cited

OTHER PUBLICATIONS

3GPP TS 38.331 V16.2.0 (Sep. 2020), 3rd Generation Partnership Project; Technical Specification Group Radio Access Network; NR; Radio Resource Control (RRC) protocol specification (Release 16) 921 pages.
3GPP TSG RAN WG1 #103-e, Tdoc R1-2009201, e-Meeting, Oct. 26-Nov. 13, 2020, Agenda Item 8.7.1.2, Ericsson, "Provisioning of Potential TRS/CSI-RS Occasion(s) for Idle/Inactive UEs," (XP051946892) 12 pages.
3GPP TSG RAN WG1 Meeting#88bis, R1-1704440, Spokane, Washington, US Apr. 3-7, 2017, Agenda Item 8.1.1.5, MediaTek Inc., "Discussion on DL RRM Measurement," (XP051242587) 5 pages.
3GPP TSG RAN WG1 Meeting #89, R1-1707051, Hangzhou, P.R. China, May 15-19, 2017, Agenda Item 7.1.1.5.2, ZTE, "RRM measurements on CSI-RS for L3 mobility," (XP051272281) 7 pages.
3GPP TSG RAN WG1 Meeting#89, R1-1707820, Hangzhou, China May 15-19, 2017, Agenda Item 7.1.1.5.2, MediaTek Inc., "Discussion on Properties of CSI-RS for RRM Measurement," (XP051273021) 4 pages.
3GPP TSG RAN WG1 #102-e, Tdoc R1-2006666, e-Meeting, Aug. 17-28, 2020, Agenda Item 8.7.1.2, Ericsson, "Provisioning of potential TRS/CSI-RS occasion(s) for Idle/Inactive UEs," (XP051918180) 5 pages.
3GPP TSG-RAN WG1, #106-bis-e R1-2110198, e-Meeting, Oct. 11-19, 2021, Agenda Item 8.7.1.2, Qualcomm Incorporated, "TRS/CSI-RS for idle/inactive UE power saving," (XP052059134) 9 pages.
3GPP TSG-RAN2, Meeting #111-e R2-2007261, eMeeting, Aug. 17-28, 2020, Agenda Item 8.9.2 Idle/Inactive-mode UE power saving, Ericsson, "Exposure of connected mode TRS occasions to Idle and Inactive mode," (XP051912060) 5 pages.
3GPP TSG-RAN WG2 Meeting #112 electronic, R2-2008946, Online, Nov. 2-13, 2020, Agenda Item 8.9.3, Xiaomi Communications, "Discussion on TRS CSI-RS for RRC-IDLE and RRC-Inactive State UE," (XP051941996) 6 pages.
3GPP TSG-RAN WG2 Meeting #113 electronic, R2-2102469, Online, Jan. 25-Feb. 5, 2021, Agenda Item 8.9.3, Xiaomi Communications, "Summary of [041][ePowSav] TRS/CSI-RS for Idle Inactive," (XP051978209) 13 pages.

* cited by examiner

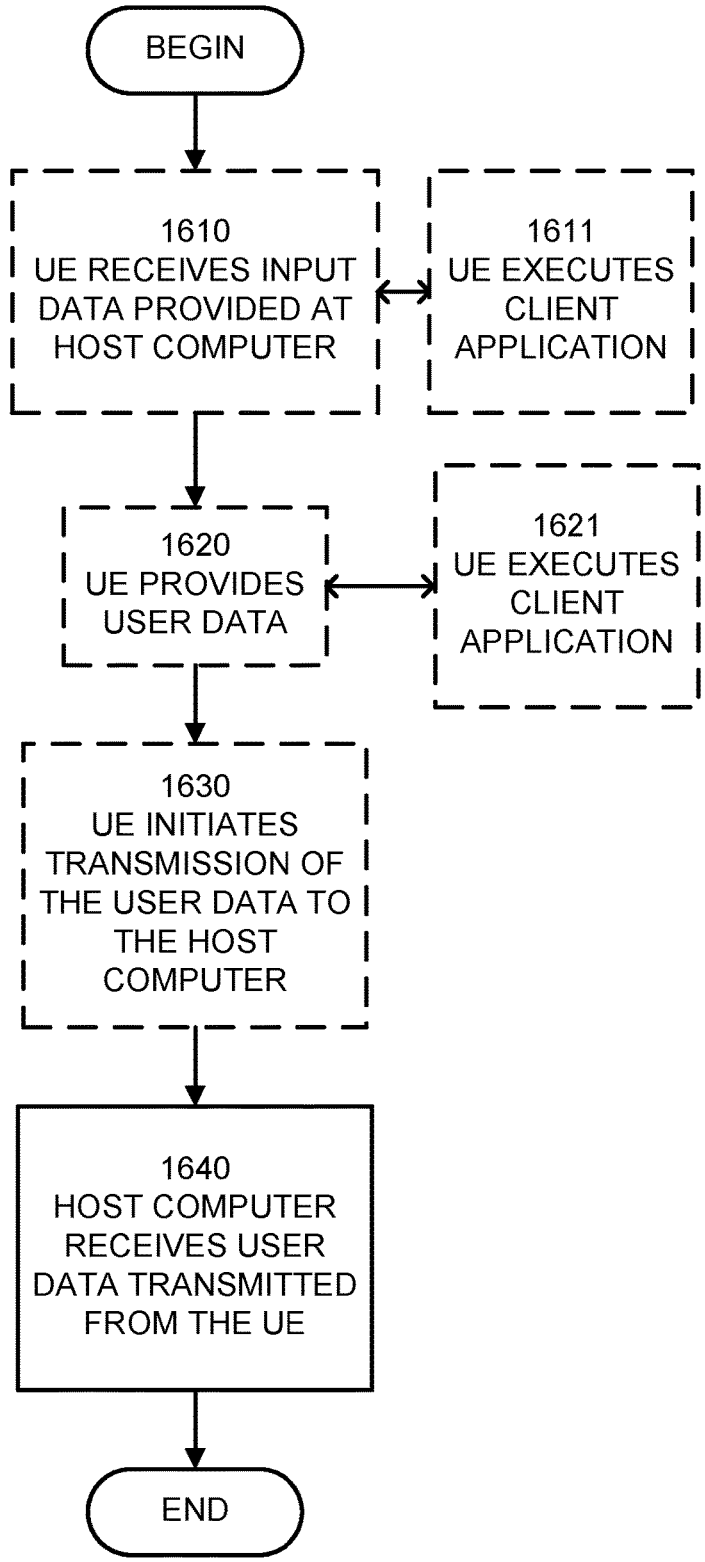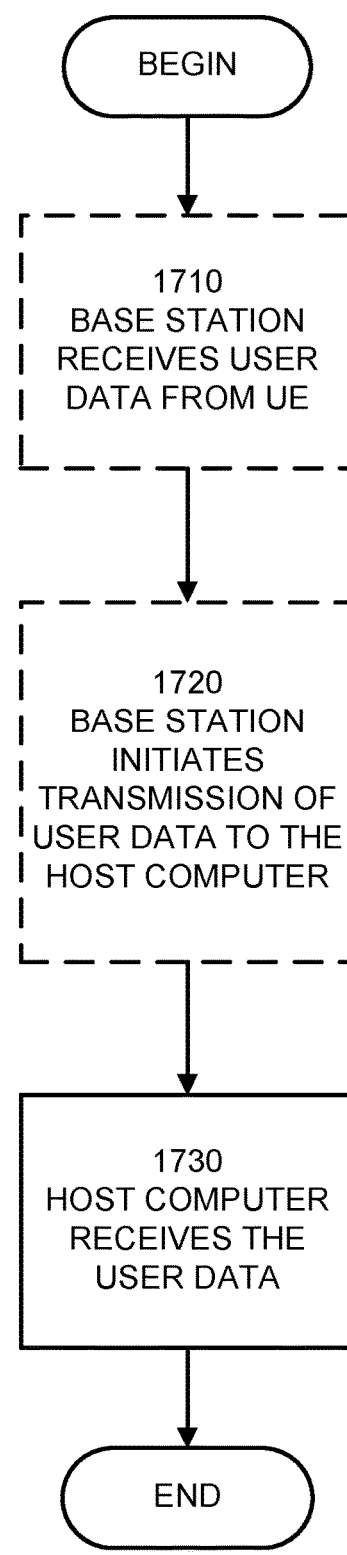
Figure 16
Figure 17

METHODS OF PROVISION OF CSI-RS FOR MOBILITY TO IDLE USER EQUIPMENTS

CROSS REFERENCE TO RELATED APPLICATIONS

This application is a 35 U.S.C. § 371 national stage application of PCT International Application No. PCT/SE2021/050993 filed on Oct. 11, 2021, which in turn claims domestic priority to U.S. Provisional Patent Application No. 63/092,880, filed on Oct. 16, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

The information element (IE) CSI-RS-ResourceConfig-Mobility is used to configure CSI-RS (channel state information-reference signal) based RRM (radio resource management). This information element is provided below:

```
-- ASN1START
-- TAG-CSI-RS-RESOURCECONFIGMOBILITY-START
CSI-RS-ResourceConfigMobility ::=      SEQUENCE {
    subcarrierSpacing           ,
    csi-RS-CellList-Mobility          SEQUENCE (SIZE (1..maxNrofCSI-RS-CellsRRM)) OF CSI-RS-CellMobility,
    ...,
    [[
    refServCellIndex          ServCellIndex           OPTIONAL   -- Need S
    ]]
}
CSI-RS-CellMobility ::=          SEQUENCE {
    cellId              PhysCellId,
    csi-rs-MeasurementBW             SEQUENCE {
        nrofPRBS               ENUMERATED { size24, size48, size96, size192, size264},
        startPB                INTEGER(0..2169)
    },
    density             ENUMAERATED {d1,d3}          OPTIONAL,   -- Need R
    csi-rs-ResourceList-Mobility         SEQUENCE (SIZE (1..maxNrofCSI-RS-ResourcesRRM)) OF CSI-RS-Resource-Mobility
}
CSI-RS-Resource-Mobility ::=           SEQUENCE {
    csi-RS-Index,          CSI-RS-Index,
    slotConfig           CHOICE {
        ms4              INTEGER (0..31),
        ms5              INTEGER (0..39),
        ms10             INTEGER (0..79),
        ms20             INTEGER (0..159),
        ms40             INTEGER (0..319)
    },
    associatedSSB           SEQUENCE {
        ssb-Index           SSB-Index,
        isQuasiColocated          BOOLEAN
    }                                   OPTIONAL, -- Need R
    frequencyDomainAllocation             CHOICE {
        row1          BIT STRING (SIZE (4)),
        row2          BIT STRING (SIZE (12))
    },
    firstOFDMSymbolInTimeDomain           INTEGER (0..13),
    sequenceGenerationConfig              INTEGER (0..1023),
    ...
}
CSI-RS-Index ::=       INTEGER (0..maxNrofCSI-RS-ResourcesRRM-1)
-- TAG-CSI-RS-RESOURCECONFIGMOBILITY-STOP
-- ASN1STOP
```

| CSI-RS-CellMobility field descriptions |
| --- |
| csi-rs-ResourceList-Mobility
List of CSI-RS resources for mobility. The maximum number of CSI-RS resources that can be configured per measObjectNR depends on the configuration of associatedSSB (see TS 38.214 [19], clause 5.1.6.1.3).
density
Frequency domain density for the 1-port CSI-RS for L3 mobility. See TS 38.211 [16], clause 7.4.1.
nrofPRBs
Allowed size of the measurement bandwidth (BW) in physical resource blocks (PRBs). See TS 38.211 [16], clause 7.4.1.
startPRB
Starting PRB index of the measurement bandwidth. See TS 38.211 [16], clause 7.4.1.
CSI-RS-ResourceConfigMobility field descriptions
csi-RS-CellList-Mobility
List of cells for CSI-RS based RRM measurements.
refServCellIndex
Indicates the serving cell providing the timing reference for CSI-RS resources without associatedSSB. The field may be present only if there is at least one CSI-RS resource configured without associatedSSB. If this field is absent, the UE shall use the timing of the PCell for measurements on the CSI-RS resources without associatedSSB. The CSI-RS resources and the serving cell indicated by refServCellIndex for timing reference should be located in the same band.
subcarrierSpacing
Subcarrier spacing of CSI-RS. Only the values 15, 30 kHz or 60 kHz (FR1), and 60 or 120 kHz (FR2) are applicable.
CSI-RS-Resource-Mobility field descriptions
associatedSSB
If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH (synchronization signal/physical broadcast channel) block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is required to measure the CSI-RS resource even if SS/PBCH block(s) with cellId in the CSI-RS-CellMobility are not detected.
CSI-RS resources with and without associatedSSB may be configured in accordance with the rules in TS 38.214 [19], clause 5.1.6.1.3.
csi-RS-Index
CSI-RS resource index associated to the CSI-RS resource to be measured (and used for reporting).
firstOFDMSymbolInTimeDomain
Time domain allocation within a physical resource block. The field indicates the first orthogonal frequency division multiplexing (OFDM) symbol in the PRB used for CSI-RS, see TS 38.211 [16], clause 7.4.1.5.3. Value 2 is supported only when dmrs-TypeA-Position equals pos3.
frequency DomainAllocation
Frequency domain allocation within a physical resource block in accordance with TS 38.211 [16], clause 7.4.1.5.3 including table 7.4.1.5.2-1. The number of bits that may be set to one depend on the chosen row in that table.
is QuasiColocated
Indicates that the CSI-RS resource is quasi co-located with the associated SS/PBCH block, see TS 38.214 [19], clause 5.1.6.1.3.
sequenceGenerationConfig
Scrambling ID for CSI-RS (see TS 38.211 [16], clause 7.4.1.5.2).
slotConfig
Indicates the CSI-RS periodicity (in milliseconds) and for each periodicity the offset (in number of slots). When subcarrierSpacingCSI-RS is set to kHz15, the maximum offset values for periodicities ms4/ms5/ms10/ms20/ms40 are 3/4/9/19/39 slots. When subcarrierSpacingCSI-RS is set to kHz30, the maximum offset values for periodicities ms4/ms5/ms10/ms20/ms40 are 7/9/19/39/79 slots. When subcarrierSpacingCSI-RS is set to kHz60, the maximum offset values for periodicities ms4/ms5/ms10/ms20/ms40 are 15/19/39/79/159 slots. When subcarrierSpacingCSI-RS is set kHz120, the maximum offset values for periodicities ms4/ms5/ms10/ms20/ms40 are 31/39/79/159/319 slots. |

SUMMARY

In NR (new radio), in connected mode, a UE (user equipment) is provided either with periodic, semi-periodic or aperiodic CSI-RS/TRS (CSI-Tracking Reference Signals or CSI RS for tracking) so the UE can measure the channel qualities, and/or track the reference signal in order to fine tune the UE's time and frequency synchronization. Such RSs may also not be turned off despite some individual UEs being in Idle/Inactive states. Nevertheless, the UE is not aware of the potential existence of such RSs during the RRC_Idle/Inactive. As such, the UE conventionally relies on Synchronization Signal block (SSB) signals during RRC_Idle/Inactive for e.g. AGC (automatic gain control) setting, synchronization, and/or cell quality measurements.

The problem with SSB measurements is that SSB signals arrive in long time intervals, e.g. 20 ms, and sometimes the UE may need to stay out of deep sleep for an extended time before it is able to e.g. read its paging message after the previously available SSB reception, which leads to a waste of UE energy.

In Rel 17 WI on UE Power savings, an agreement was reached to specify provision of potential connected mode CSI-RS occasions to the idle UEs such as TRS at the high level. Furthermore, some other candidates such as CSI-RS for mobility are also mentioned but no detail on how the provision should be provided was elaborated.

There is thus a gap in detailed methods of provision of for example CSI-RS for mobility to idle UEs. Various embodiments of inventive concepts provide such information to idle UEs in which the network can inform an idle UE (i.e., a UE which is either in RRC_idle (Radio Resource Control_idle) or RRC_Inactive state), of potential connected mode CSI-RS for mobility occasions.

According to some embodiments of inventive concepts, a method by a network node to provide connected mode channel state information-reference signal, CSI-RS, for mobility to an user equipment, UE, while in idle mode includes providing the UE with an indication that CSI-RS for mobility occasions are available in idle mode based on determining that the UE is transitioning into idle or mode or is in idle mode. The method includes transmitting a CSI-RS for mobility occasion to the UE while the UE is in idle mode.

Analogous network nodes, computer program products, and computer programs are also provided.

Advantages that may be achieved with the inventive concepts is that providing the UE with mechanisms enable to UE to become aware of the presence and configuration of potential additional RSs than SSB during RRC_Idle/Inactive, so the UE can use this knowledge in order to achieve a higher power savings by avoiding some SSB measurements and thus remaining longer in a sleep state.

According to some other embodiments of inventive concepts, a method by a user equipment (UE) includes indicating to the network node that the UE is transitioning into idle mode or is in idle mode. The method includes receiving an indication from a network node that channel state information-reference signal, CSI-RS for mobility occasions are available in idle mode. The method includes receiving a CSI-RS for mobility occasion while the UE is in idle mode.

Analogous user equipment, computer program products, and computer programs are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 16 is a block diagram of methods implemented in a communication system including a host computer, a base station and a user equipment in accordance with some embodiments; and FIG. 17 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 2:
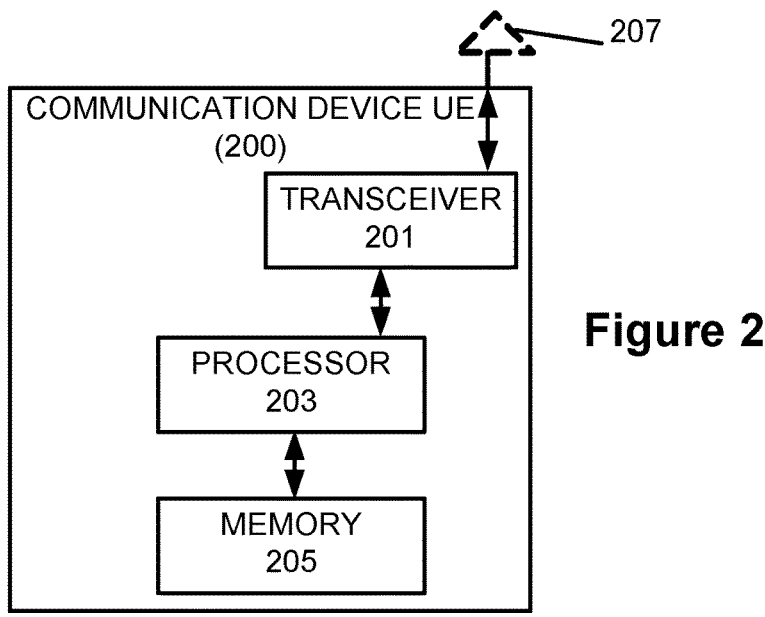
FIG. 2 is a block diagram illustrating a wireless device UE according to some embodiments of inventive concepts.

FIG. 2 is a block diagram illustrating elements of a communication device UE 200 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 200 may be provided, for example, as discussed below with respect to wireless device 910 of FIG. 9, UE 1000 of FIG. 10, hardware 1130 and virtual machine 1140 of FIG. 11, UEs 1291, 1292 of FIG. 12, and UE 1330 of FIG. 13.) As shown, communication device UE may include an antenna 207 (e.g., corresponding to antenna 911 of FIG. 9 and antennas 11225 of FIG. 11), and transceiver circuitry 201 (also referred to as a transceiver, e.g., corresponding to interface 914 of FIG. 9, transmitter 1033 and receiver 1035 of FIG. 10, and radio interface 1337 of FIG. 13) including a transmitter and a receiver configured to provide uplink and downlink radio communications with a base station(s) (e.g., corresponding to network node 960 of FIG. 9, also referred to as a RAN node) of a radio access network. Communication device UE may also include processing circuitry 203 (also referred to as a processor, e.g., corresponding to processing circuitry 920 of FIG. 9, processor 1001 of FIG. 10, processing circuitry 1160 of FIG. 11, and processing circuitry 1338 of FIG. 13.) coupled to the transceiver circuitry, and memory circuitry 205 (also referred to as memory, e.g., corresponding to device readable medium 930 of FIG. 9, memory 1015 of FIG. 10, and memory 1190-1, 1190-2 of FIG. 11) coupled to the processing circuitry. The memory circuitry 205 may include computer readable program code that when executed by the processing circuitry 203 causes the processing circuitry to perform operations according to embodiments disclosed herein. According to other embodiments, processing circuitry 203 may be defined to include memory so that separate memory circuitry is not required. Communication device UE may also include an interface (such as a user interface) coupled with processing circuitry 203, and/or communication device UE may be incorporated in a vehicle.

As discussed herein, operations of communication device UE may be performed by processing circuitry 203 and/or transceiver circuitry 201. For example, processing circuitry 203 may control transceiver circuitry 201 to transmit communications through transceiver circuitry 201 over a radio interface to a radio access network node (also referred to as a base station) and/or to receive communications through transceiver circuitry 201 from a RAN node over a radio interface. Moreover, modules may be stored in memory circuitry 205, and these modules may provide instructions so that when instructions of a module are executed by processing circuitry 203, processing circuitry 203 performs respective operations (e.g., operations discussed below with respect to Example Embodiments relating to wireless communication devices). According to some embodiments, a communication device UE 200 and/or an element(s)/function(s) thereof may be embodied as a virtual node/nodes and/or a virtual machine/machines.

Figure 3:
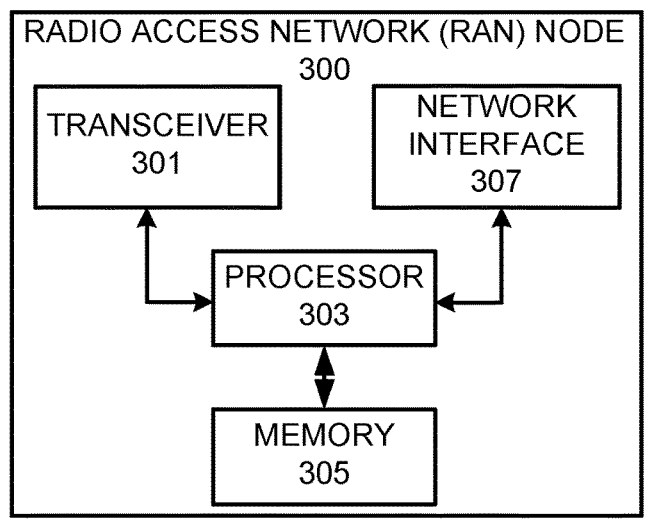
FIG. 3 is a block diagram illustrating a radio access network RAN node (e.g., a base station eNB/gNB) according to some embodiments of inventive concepts.

FIG. 3 is a block diagram illustrating elements of a radio access network RAN node 300 (also referred to as a network node, base station, eNodeB/eNB, gNodeB/gNB, etc.) of a Radio Access Network (RAN) configured to provide cellular communication according to embodiments of inventive concepts. (RAN node 300 may be provided, for example, as discussed below with respect to network node 960 of FIG. 9, hardware 1130 and virtual machine 1140 of FIG. 11 base stations 1212A, 1212B, and 1212C of FIG. 12, and base station 1320 of FIG. 13.) As shown, the RAN node may include transceiver circuitry 301 (also referred to as a transceiver, e.g., corresponding to portions of interface 990 of FIG. 9) including a transmitter and a receiver configured to provide uplink and downlink radio communications with mobile terminals. The RAN node may include network interface circuitry 307 (also referred to as a network interface, e.g., corresponding to portions of interface 990 of FIG. 9, and communication interface 1326 and radio interface 1327 of FIG. 13) configured to provide communications with other nodes (e.g., with other base stations) of the RAN and/or core network CN. The network node may also include processing circuitry 303 (also referred to as a processor, e.g., corresponding to processing circuitry 970 of FIG. 9, processing circuitry 1160 of FIG. 11, and processing circuitry 1328 of FIG. 13) coupled to the transceiver circuitry, and memory circuitry 305 (also referred to as memory, e.g., corresponding to device readable medium 980 of FIG. 9 and memory 1190-1 and 1190-2 of FIG. 11) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that a separate memory circuitry is not required.

As discussed herein, operations of the RAN node may be performed by processing circuitry 303, network interface 307, and/or transceiver 301. For example, processing circuitry 303 may control transceiver 301 to transmit downlink communications through transceiver 301 over a radio interface to one or more mobile terminals UEs and/or to receive uplink communications through transceiver 301 from one or more mobile terminals UEs over a radio interface. Similarly, processing circuitry 303 may control network interface 307 to transmit communications through network interface 307 to one or more other network nodes and/or to receive communications through network interface from one or more other network nodes. Moreover, modules may be stored in memory 305, and these modules may provide instructions so that when instructions of a module are executed by processing circuitry 303, processing circuitry 303 performs respective operations (e.g., operations discussed below with respect to Example Embodiments relating to RAN nodes). According to some embodiments, RAN node 300 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 4:
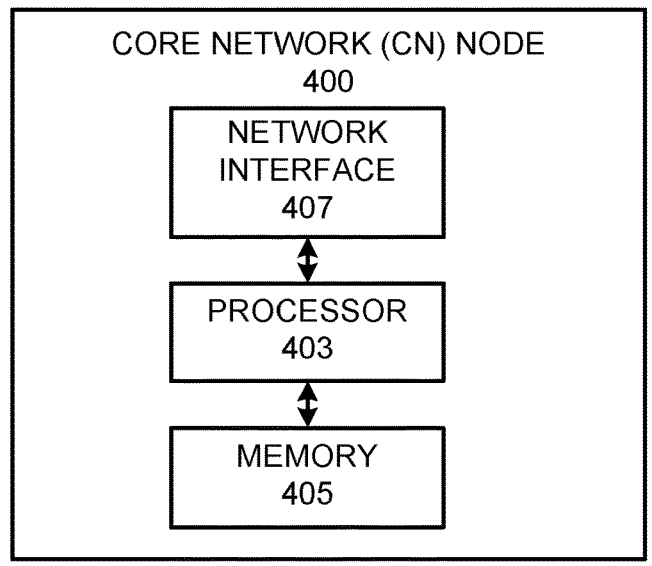
FIG. 4 is a block diagram illustrating a core network CN node (e.g., an access and mobility management function (AMY) node, a session management function (SMF) node, etc.) according to some embodiments of inventive concepts.

FIG. 4 is a block diagram illustrating elements of a core network CN node (e.g., an SMF node, an AMF node, etc.) of a communication network configured to provide cellular communication according to embodiments of inventive concepts. As shown, the CN node may include network interface circuitry 407 (also referred to as a network interface) configured to provide communications with other nodes of the core network and/or the radio access network RAN. The CN node may also include a processing circuitry 403 (also referred to as a processor) coupled to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the CN node may be performed by processing circuitry 403 and/or network interface circuitry 407. For example, processing circuitry 403 may control network interface circuitry 407 to transmit communications through network interface circuitry 407 to one or more other network nodes and/or to receive communications through network interface circuitry from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to core network nodes). According to some embodiments, CN node 400 and/or an element(s)/function(s) thereof may be embodied as a virtual node/nodes and/or a virtual machine/machines.

As previously described, there is a gap in detailed methods of provision of for example CSI-RS for mobility to idle UEs. Various embodiments of inventive concepts enable a network to inform an idle UE (i.e., a UE which is either in RRC_idle or RRC_Inactive state), of potential connected mode CSI-RS for mobility occasions.

Furthermore, in some embodiments of inventive concepts, the network can indicate to the UE if the CSI-RS for mobility is transmitted or not in those occasions.

The network may also indicate the configuration and presence for mobility CSI-RS in other cells and the UE may select to use an other-cell RS instead of or in addition to a camping-cell RS for e.g. loop convergence.

Advantages that may be achieved with the inventive concepts is that providing the UE with mechanisms enable to UE to become aware of the presence and configuration of potential additional RSs than SSB during RRC_Idle/Inactive, so the UE can use this knowledge in order to achieve a higher power savings by avoiding some SSB measurements and thus remaining longer in a sleep state.

Various scenarios shall be described to explain the inventive concepts where the UE is in connected mode and is configured with one or more specific CSI-RS for mobility configurations. In one scenario, when the UE goes to idle mode, the network may indicate to the UE of potential occasions of the CSI-RS for mobility and/or the availability of such a RS in such occasions. The below example embodiments discloses inventive concepts with which the network can provide potential occasions of CSI-RS for mobility to idle UEs and furthermore, how the network can indicate their availability in the relevant occasions.

Scenario 1: Provision of Potential Connected Mode CSI-RS for Mobility to Idle UEs In one embodiment of inventive concepts, the idle UE can be pre-configured to assume specific connected mode CSI-RS for mobility occasions are available in idle mode. For example, the specifications such as 3GPP specifications may be changed to indicate that if the field associatedSSB is present and furthermore the field isQuasiColocated indicates that the CSI-RS is quasi-colocated (QCL) with the associated SS/PBCH (synchronization signal/physical broadcast channel) blocks, then the UE can consider such occasions in the idle mode. This embodiment of inventive concepts is particularly applicable to the UEs who have been in a connected mode in a specific cell. In such a case, if the specification allows the solution, the UE can keep this part of the RRC configuration as potential occasions for CSI-RS and thereby have potentially access to more RSs during the idle mode.

In another example, the network may provide the potential occasions of CSI-RS for mobility through higher layer signaling, e.g., SI (system information), RRC release or dedicated RRC signaling. For example, the network may duplicate the whole or part of the connected mode CSI-RS-ResourceConfigMobility configuration in one of the SIB s (system information blocks). The network may decide to make one or more fields in CSI-RS-ResourceConfigMobility optional in order to reduce the overhead. For example, the network may skip subcarrierSpacing, and if it is absent, then the idle UE can assume SCS (subcarrier spacing) of CSI-RS for mobility is the same as the SCS of the bandwidth within which the UE is expected to monitor paging. Furthermore, the network may make the field refServCellIndex optional as for an idle UE, the CSI-RS is useful if it is associated and quasi colocated with the SSBs the UE expects to receive.

Scenario 2: Provision of Availability of CSI-RS for Mobility to Idle UEs

In another embodiment of inventive concepts, if the network provides the CSI-RS for mobility configuration, e.g., through SI, then the idle UE can have the guarantee that CSI-RS is available in the indicated occasions. Alternatively, a validity timer can be associated with the provision. For example, as part of the provision of configuration, the network may provide a validity timer, and in the next SI broadcast, the network can reduce the validity timer accordingly, keep it the same or increase it, in case the network knows the CSI-RS is going to be valid for a longer time than the previous validity timer. Furthermore, in case the validity timer is not present, the network can additionally indicate if the configuration is valid for all the time, or that the configuration merely provides the occasions and not the availability, e.g., as an extra field in the provision of configuration. In such an example, the UE acquires the relevant higher layer signaling, e.g., SIB1, and then acquires the CSI-RS for mobility configuration and potentially with a validity timer. The UE can then decide to exploit the additional CSI-RS for idle mode measurements, e.g., AGC (automatic gain control), T/F (time/frequency) synchronization, and/or RRM measurements if the specifications allows until the validity timer is expired. If the validity timer is expired, and the idle UE still wishes to exploit the CSI-RS for mobility, then it can reacquire the SIB1 to see if the CSI-RS is still valid.

Alternatively, the network may indicate the validity through L1 signaling, e.g., an additional bitfield in the paging DCI (downlink control information), or another idle mode DCI, e.g., an early paging indicator can indicate the presence or absence of the CSI-RS for mobility in its potential occasions. Alternatively, implicit techniques can be employed by the network. For example, if the UE is paging in the first occasion, the UE may assume the CSI-RS for mobility is available at least until the second occasion, or until a specific validity timer is expired. The same approach can be used for other idle mode DCI, e.g., an early paging indicator. For example, if an early paging indicator indicates an upcoming paging, then the UE can assume CSI-RS for mobility is available in the subsequent potential occasions.

Scenario 3: Provision of Presence and Availability of CSI-RS for Mobility in Other Cells In some other embodiments of inventive concepts, a UE may utilize CSI-RS from multiple cells to perform loop convergence operations. For example, a cell-edge UE may, depending on the timing of mobility CSI-RS transmissions in the camping and neighbor cells, select a CSI-RS from a neighbor cell instead of one from the camping cell. This may be done e.g. if the former has a more advantageous timing with respect to other signals to be received from the camping cell—if this allows extending deep sleep for the UE and/or reduces the RF on-time for sample collection. Alternatively or additionally, the UE may use both camping and neighbor cells' CSI-RS for loop convergence operations, e.g. frequency offset estimation at low SINR (signal to noise and interference ratio).

In one embodiment, the network may additionally provide occasions of CSI-RS for mobility through higher layer signaling, e.g., in SI, RRC release or dedicated RRC signaling. For example, the network may duplicate the other-cell mobility signal information part of the connected mode CSI-RS-ResourceConfigMobility configuration in one of the SIBs. Just like in relation to the camping cell, the network may make some fields optional to reduce the overhead.

Mobility CSI-RS availability indication for other cells may be provided with mechanisms similar to those used for camping cell availability, including explicit or implicit indications of validity.

In one embodiment, a bitmap may be used, including positions for multiple cells, where camping and other cell availability is indicated. The bitmap may be changed dynamically without changing the SI (if the bitmap is provided via DCI) or the rest of the SI (if the bitmap is provided in the SI).

In another embodiment, the presence of the configuration info for other cells in the SI serves as an availability indication.

Figure 1:
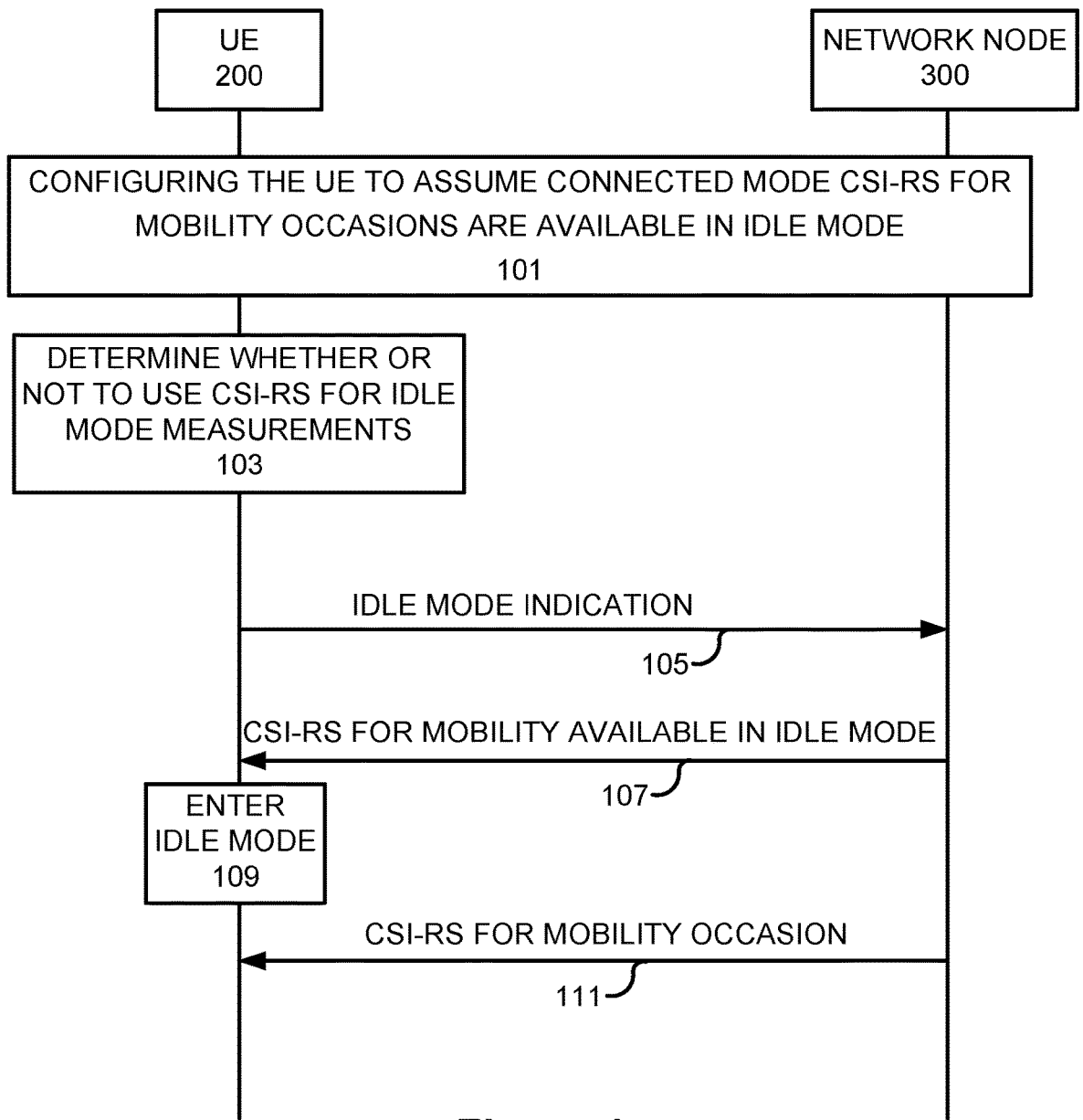
FIG. 1 is a signaling diagram illustrating communications between a UE and a network node according to some embodiments of inventive concepts.

FIG. 1 illustrates a signaling diagram in which the UE 200 and network node 300 communicate the various scenarios above from a high level point of view. In operation 101, the UE 200 is configured to assume connected mode CSI-RS for mobility occasions are available in UE. The connected mode CSI-RS may have some fields removed to reduce overhead as described above. In operation 103, the UE 200 determines whether or not to use CSI-RS for idle mode measurements as described above.

In operation 105, the UE 200 transmits an idle mode indication to the network node 300 that the UE is entering idle mode. In operation 107, the network node 300 indicates whether or not CIS-RS for mobility is available in idle mode. This indication may be sent prior to the UE transmitting the idle mode indication.

In operation 109, the UE enters idle mode. In operation 111, the network node 300 transmits a CSI-RS for mobility occasion to the UE 200. Based on the decision made in operation 103, the UE may or many not use the CSI-RS for idle mode measurements.

Operations of the network node 300 (implemented using the structure of the block diagram of FIG. 3) will now be discussed with reference to the flow chart of FIG. 5 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

Figure 5:
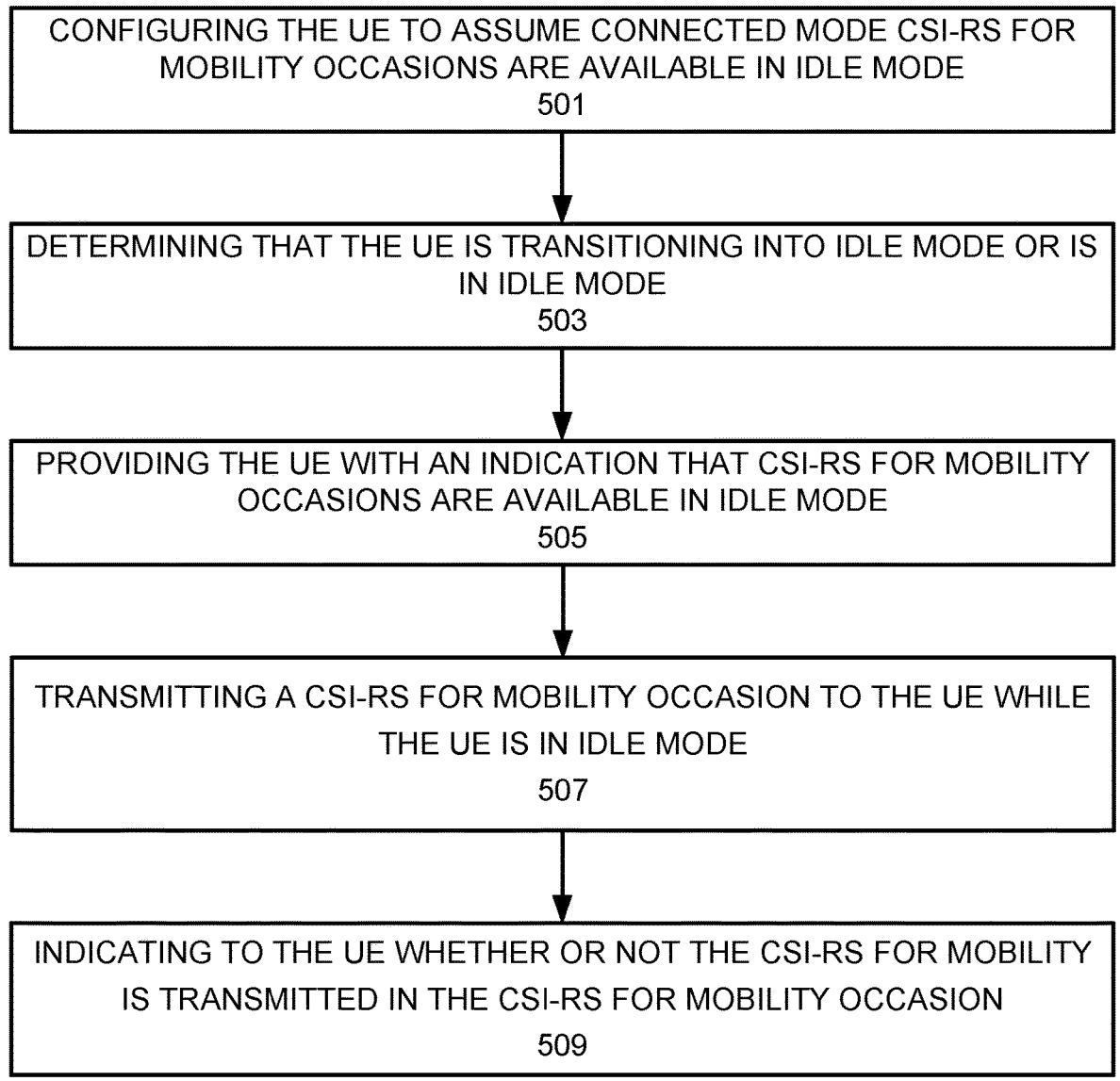
FIGS. 5-6 are flow charts illustrating operations of a network node according to some embodiments of inventive concepts.

Turing to FIG. 5, in block 501, the processing circuitry 303 configures the UE 200 to assume connected mode CSI-RS for mobility occasions are available in idle mode. In block 503, the processing circuitry 303 determines that the UE is going into idle mode or is in idle mode. For example, the processing circuitry 303 may receive an idle mode indication from the UE 200 indicating that the UE 200 is going into idle mode.

In operation 505, the processing circuitry 303 provides the UE 200 with an indication that CSI-RS for mobility occasions are available in idle mode. In some embodiments of inventive concepts, providing the UE with the indication includes providing an associatedSSB (associated synchronization signal block) field with an associated SS/PBCH (synchronization signal/physical broadcast channel) and indicating in a isQuasiColocated field that the CIS-RS is quasi-colocated with the associated SS/PBCH.

In other embodiments of inventive concepts, providing the UE with the indication includes providing at least part of a connected mode CSI-RS-ResourceConfigMobility configuration. This allows the network node 300 to reduce overhead by removing some fields as described above.

Figure 6:
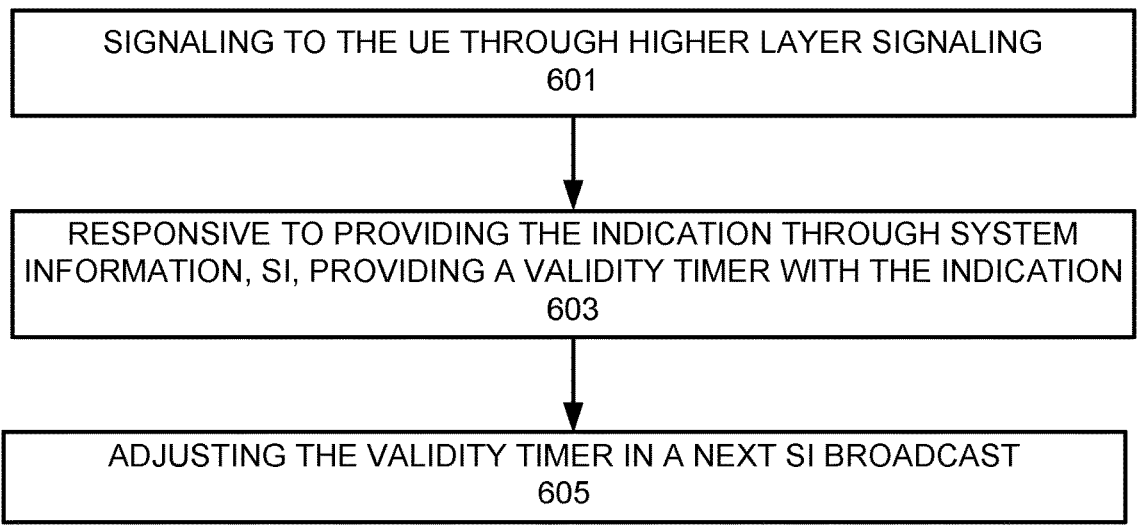

Turning to FIG. 6, in other embodiments of inventive concepts, providing the UE with the indication includes the processing circuitry 303 signaling, in block 601, the UE through higher layer signaling. The higher layer signaling can be system information (SI), RRC release, or dedicated RRC signaling.

In block 603, responsive to providing the indication through SI, the processing circuitry 303 provides a validity timer with the indication. In block 605, the processing circuitry 303 adjusts the validity timer in a next SI broadcast as described in the above scenarios.

In instances where the validity timer is not provided with the indication, the processing circuitry 303 may indicate an indication through L1 signaling of whether the configuration is valid for all the time or whether the configuration merely provides the occasions and not the availability of CSI-RS for mobility. For example, an additional bitfield in a paging DCI may be used to provide the indication.

Returning to FIG. 5, in block 507, the processing circuitry 303, via transceiver 301 and/or network interface 307, transmits a CSI-RS for mobility occasion to the UE 200 while the UE 200 is in idle mode. This may occur responsive to deciding to transmit the CSI-RS for mobility occasion to the UE.

In block 509, the processing circuitry 303 indicates to the UE whether or not the CSI-RS for mobility is transmitted in the CSI-RS for mobility occasion. The indicating to the UE can be via any of L1 signaling, through higher layer signaling, or a specific characteristic in a reference signal transmitted in idle mode. The L1 signaling can by a paging DCI, a SI update, or another idle mode DCI. The specific characteristic in the RS can be any of a SSB, a TRS, or a CSI for mobility.

Various operations from the flow chart of FIG. 5 may be optional with respect to some embodiments of network nodes and related methods. Regarding methods of example embodiment 1 (set forth below), for example, operations of blocks 501 and 509 of FIG. 5 may be optional.

Operations of a user equipment (UE) 200 (implemented using the structure of FIG. 2) will now be discussed with reference to the flow chart of FIG. 7 according to some embodiments of inventive concepts. For example, modules may be stored in memory 205 of FIG. 2, and these modules may provide instructions so that when the instructions of a module are executed by respective UE processing circuitry 203, processing circuitry 203 performs respective operations of the flow chart.

Figure 7:
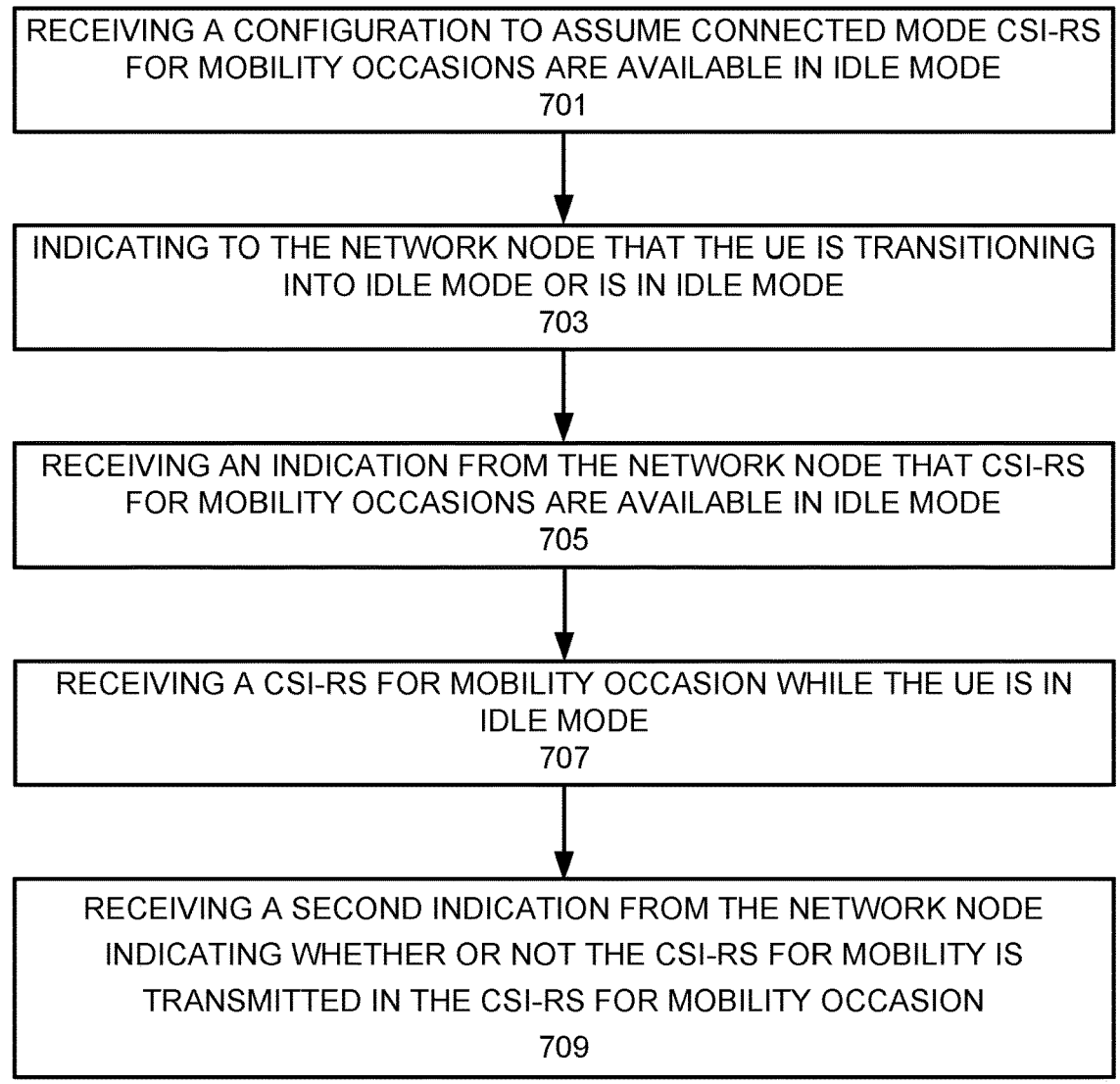
FIGS. 7-8 are flow charts illustrating operations of a user equipment according to some embodiments of inventive concepts.

Turning to FIG. 7, in block 701, the processing circuitry 203 receives a configuration to assume connected mode CSI-RS for mobility occasions are available in idle mode. In block 703, the processing circuitry 203 indicates to the network node that the UE is transitioning into idle mode or is in idle mode. For example, the processing circuitry 403 may transmit an idle mode indication to the network node to indicate that the UE is transitioning into idle mode.

In block 705, the processing circuitry 203 receives an indication from a network node that channel state information-reference signal, CSI-RS for mobility occasions are available in idle mode. In some embodiments of inventive concepts, receiving the indication includes receiving a synchronization signal/physical broadcast channel, SS/PBCH, block including an associatedSSB field and a isQuasiColocated field that indicates that the CSI-RS is quasi-colocated with the SS/PBCH.

Figure 8:
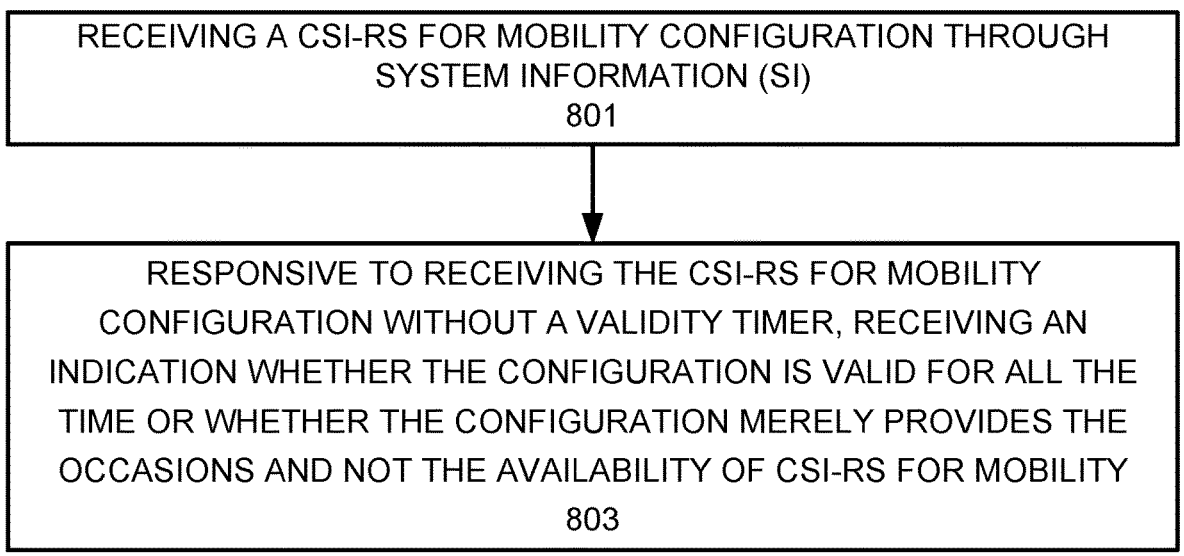

The indication can be received in other ways. For example, turning to FIG. 8, in block 801, the processing circuitry 203 receives the indication by receiving a CSI-RS for mobility configuration through system information (SI). In some embodiments of inventive concepts, receiving the CSI-RS for mobility configuration includes receiving a validity timer as described above.

In other embodiments of inventive concepts, the validity timer is not received with the CSI-RS for mobility configuration. Thus, in block 803, the processing circuitry 203, responsive to receiving the CSI-RS for mobility configuration without a validity timer, receives an indication through L1 signaling of whether the configuration is valid for all the time or whether the configuration merely provides the occasions and not the availability of CSI-RS for mobility. For example, receiving the indication through L1 signaling may include receiving the indication via an additional bitfield in a paging downlink control information, DCI, as described above.

Returning to FIG. 7, in block 707, the processing circuitry 203 receives a CSI-RS for mobility occasion while the US is in idle mode.

In block 709, the processing circuitry 203 receives a second indication from the network node indicating whether or not the CSI-RS for mobility is transmitted in the CSI-RS for mobility occasion. The second indication can be received via any of L1 signaling, through higher layer signaling, or a specific characteristic in a reference signal transmitted in idle mode. The L1 signaling can by a paging DCI, a SI update, or another idle mode DCI. The specific characteristic in the RS can be any of a SSB, a TRS, or a CSI for mobility In some scenarios, the UE is at an edge of a cell as described above and can be considered to be a cell-edge UE. In these scenarios, the processing circuitry 203, responsive to the UE being a cell-edge UE, select a CSI-RS from a neighboring cell. The selection may also include a CSI-RS from a camping cell in which the UE is camping.

Various operations from the flow chart of FIG. 7 may be optional with respect to some embodiments of UEs and related methods. Regarding methods of example embodiment 13 (set forth below), for example, operations of blocks 701 and 709 of FIG. 7 may be optional.

Example embodiments are discussed below.

EMBODIMENTS

Embodiment 1. A method by a network node (300) to provide connected mode channel state information-reference signal, CSI-RS, for mobility to an user equipment while in idle mode, the method comprising:
 determining (503) that the UE is going into idle mode or is in idle mode;
 providing (505) the UE with an indication that CSI-RS for mobility occasions are available in idle mode; and
 transmitting (507) a CSI-RS for mobility occasion to the UE while the UE is in idle mode responsive to deciding to transmit the CSI-RS for mobility occasion to the UE.

Embodiment 2. The method of Embodiment 1, further comprising configuring (501) the UE to assume connected mode CSI-RS for mobility occasions are available in idle mode.

Embodiment 3. The method of any of Embodiments 1-2 wherein determining that the UE is going into idle mode or is in idle mode comprises receiving an idle mode indication from the UE that the UE is going into idle mode.

Embodiment 4. The method of any of Embodiments 1-3 wherein providing the UE with the indication comprises providing an associated synchronization signal block, associatedSSB, field with an associated synchronization signal/physical broadcast channel, SS/PBCH, and indicating in a isQuasiColocated field that the CSI-RS is quasi-colocated with the associated SS/PBCH.

Embodiment 5. The method of any of Embodiments 1-3, wherein providing the UE with the indication comprises signaling (601) the UE through higher layer signaling.

Embodiment 6. The method of Embodiment 5 wherein the higher layer signaling comprises at least one of system information, SI, radio resource control, RRC, release or dedicated RRC signaling.

Embodiment 7. The method of any of Embodiments 5-6 wherein providing the UE with the indication comprises providing at least part of a connected mode CSI-RS-ResourceConfigMobility configuration.

Embodiment 8. The method of any of Embodiments 5-6, further comprising:
 responsive to providing the indication through system information, SI, providing (603) a validity timer with the indication.

Embodiment 9. The method of Embodiment 8, further comprising adjusting (605) the validity timer in a next SI broadcast.

Embodiment 10. The method of any of Embodiments 1-9, further comprising:
 indicating (509) to the UE whether or not the CSI-RS for mobility is transmitted in the CSI-RS for mobility occasion.

Embodiment 11. The method of Embodiment 10, wherein indicating to the UE comprises indicating to the UE via any of L1 signaling, through higher layer signaling, or a specific characteristic in a RS transmitted in idle mode.

Embodiment 12. The method of Embodiment 11 wherein the L1 signaling comprises any of a paging downlink control information, DCI, a system information, SI, update, or an idle mode DCI.

Embodiment 13. The method of Embodiment 11 wherein the specific characteristic in the RS comprises any of a synchronization signal block SSB, tracking reference signal, TRS, or CSI for mobility.

Embodiment 14. A radio access network, RAN, node (300) comprising:
 processing circuitry (303); and
 memory (305) coupled with the processing circuitry, wherein the memory includes instructions that when executed by the processing circuitry causes the RAN node to perform operations comprising:
  determining (503) that the UE is going into idle mode or is in idle mode;
  providing (505) the UE with an indication that CSI-RS for mobility occasions are available in idle mode; and
  transmitting (507) a CSI-RS for mobility occasion to the UE while the UE is in idle mode responsive to deciding to transmit the CSI-RS for mobility occasion to the UE.

Embodiment 15. The RAN node (300) of Embodiment 1, wherein the memory includes further instructions that when executed by the processing circuitry causes the RAN node to perform operations further comprising configuring (501) the UE to assume connected mode CSI-RS for mobility occasions are available in idle mode.

Embodiment 16. The RAN node (300) of any of Embodiments 14-15 wherein in determining that the UE is going into idle mode or is in idle mode, the memory includes instructions that when executed by the processing circuitry causes the RAN node to perform operations comprising receiving an idle mode indication from the UE that the UE is going into idle mode.

Embodiment 17. The RAN node (300) of any of Embodiments 14-16 wherein in providing the UE with the indication, the memory includes instructions that when executed by the processing circuitry causes the RAN node to perform operations comprising providing an associated synchronization signal block, associatedSSB, field with an associated synchronization signal/physical broadcast channel, SS/PBCH, and indicating in a isQuasiColocated field that the CSI-RS is quasi-colocated with the associated SS/PBCH.

Embodiment 18. The RAN node (300) of any of Embodiments 14-16, wherein in providing the UE with the indication, the memory includes instructions that when executed by the processing circuitry causes the RAN node to perform operations comprising signaling (601) the UE through higher layer signaling.

Embodiment 19. The RAN node (300) of Embodiment 18 wherein the higher layer signaling comprises at least one of system information, SI, radio resource control, RRC, release or dedicated RRC signaling.

Embodiment 20. The RAN node (300) of any of Embodiments 18-19 wherein in providing the UE with the indication, the memory includes instructions that when executed by the processing circuitry causes the RAN node to perform operations comprising providing at least part of a connected mode CSI-RS-ResourceConfigMobility configuration.

Embodiment 21. The RAN node (300) of any of Embodiments 18-19, wherein the memory includes further instructions that when executed by the processing circuitry causes the RAN node to perform operations further comprising:
 responsive to providing the indication through system information, SI, providing (603) a validity timer with the indication.

Embodiment 22. The RAN node (300) of Embodiment 21, wherein the memory includes further instructions that when executed by the processing circuitry causes the RAN node to perform operations further comprising adjusting (605) the validity timer in a next SI broadcast.

Embodiment 23. The RAN node (300) of any of Embodiments 14-22, wherein the memory includes further instructions that when executed by the processing circuitry causes the RAN node to perform operations further comprising:
  indicating (509) to the UE whether or not the CSI-RS for mobility is transmitted in the CSI-RS for mobility occasion.

Embodiment 24. The RAN node (300) of Embodiment 23, wherein in indicating to the UE, the memory includes instructions that when executed by the processing circuitry causes the RAN node to perform operations comprising indicating to the UE via any of L1 signaling, through higher layer signaling, or a specific characteristic in a RS transmitted in idle mode.

Embodiment 25. The RAN node (300) of Embodiment 24 wherein the L1 signaling comprises any of a paging downlink control information, DCI, a system information, SI, update, or an idle mode DCI.

Embodiment 26. The RAN node (300) of Embodiment 24 wherein the specific characteristic in the RS comprises any of a synchronization signal block SSB, tracking reference signal, TRS, or CSI for mobility.

Embodiment 27. A radio access network, RAN, node (300) adapted to perform according to any of Embodiments 1-13.

Embodiment 28. A computer program comprising program code to be executed by processing circuitry (303) of a radio access network, RAN, node (300), whereby execution of the program code causes the RAN node (300) to perform operations according to any of Embodiments 1-13.

Embodiment 29. A computer program product comprising a non-transitory storage medium including program code to be executed by processing circuitry (303) of a radio access network, RAN, node (300), whereby execution of the program code causes the RAN node (300) to perform operations according to any of Embodiments 1-13.

Embodiment 30. A method performed by a user equipment, UE, (200) comprising:
  indicating (703) to the network node that the UE is going into idle mode or is in idle mode;
  receiving (705) an indication from a network node that channel state information-reference signal, CSI-RS for mobility occasions are available in idle mode; and
  receiving (707) a CSI-RS for mobility occasion while the UE is in idle mode.

Embodiment 31. The method of Embodiment 30 further comprising receiving (701) a configuration to assume connected mode CSI-RS for mobility occasions are available in idle mode.

Embodiment 32. The method of any of Embodiments 30-31 wherein indicating to the network node that the UE is going into idle mode or is in idle mode comprises transmitting an idle mode indication to the network node to indicate that the UE is going into idle mode.

Embodiment 33. The method of any of Embodiments 30-32, wherein receiving the indication comprises receiving a synchronization signal/physical broadcast channel, SS/PBCH, block including an associatedSSB field and a isQuasiColocated field indicates that the CSI-RS is quasi-colocated with the SS/PBCH.

Embodiment 34. The method of any of Embodiments 30-32, wherein receiving the indication comprises receiving (801) a CSI-RS for mobility configuration through system information, SI.

Embodiment 35. The method of Embodiment 34, wherein receiving the CSI-RS for mobility configuration includes receiving a validity timer.

Embodiment 35. The method of Embodiment 34, further comprising:
  responsive to receiving the CSI-RS for mobility configuration without a validity timer, receiving (803) an indication whether the configuration is valid for all the time or whether the configuration merely provides the occasions and not the availability of CSI-RS for mobility.

Embodiment 36. The method of Embodiment 34, further comprising:
  responsive to receiving the CSI-RS for mobility configuration without a validity timer, receiving an indication through L1 signaling of whether the configuration is valid for all the time or whether the configuration merely provides the occasions and not the availability of CSI-RS for mobility.

Embodiment 37. The method of Embodiment 36 wherein receiving the indication through L1 signaling comprises receiving the indication via an additional bitfield in a paging downlink control information, DCI.

Embodiment 38. The method of any of Embodiments 34-37, further comprising:
  responsive to receiving the CSI-RS for mobility configuration, determining whether to use CSI-RS for idle mode measurements.

Embodiment 39. The method of any of Embodiments 30-38, further comprising:
  responsive to the UE being a cell-edge UE, selecting a CSI-RS from a neighboring cell.

Embodiment 40. The method of any of Embodiments 30-38, further comprising:
  responsive to the UE being a cell-edge UE, selecting a CSI-RS from a neighboring cell and a CSI-RS from a camping cell in which the UE is camping.

Embodiment 41. The method of any of Embodiments 30-39, wherein receiving an indication comprises receiving an indication via a bitmap via one of a downlink control information, DCI, or a system information, SI.

Embodiment 42. The method of any of Embodiments 30-41, further comprising:
  receiving (709) a second indication from the network node indicating whether or not the CSI-RS for mobility is transmitted in the CSI-RS for mobility occasion.

Embodiment 43. A user equipment, UE (200) comprising:
  processing circuitry (203); and
  memory (205) coupled with the processing circuitry, wherein the memory includes instructions that when executed by the processing circuitry causes the UE to perform operations comprising:
    indicating (703) to the network node that the UE is going into idle mode or is in idle mode;
    receiving (705) an indication from a network node that channel state information-reference signal, CSI-RS for mobility occasions are available in idle mode; and
    receiving (707) a CSI-RS for mobility occasion while the UE is in idle mode.

Embodiment 44. The UE (200) of Embodiment 43 further comprising receiving (701) a configuration to assume connected mode CSI-RS for mobility occasions are available in idle mode.

Embodiment 45. The UE (200) of any of Embodiments 43-44 wherein indicating to the network node that the UE is going into idle mode or is in idle mode comprises transmitting an idle mode indication to the network node to indicate that the UE is going into idle mode.

Embodiment 46. The UE (200) of any of Embodiments 43-45, wherein receiving the indication comprises receiving a synchronization signal/physical broadcast channel, SS/PBCH, block including an associatedSSB field and a isQuasiColocated field indicates that the CSI-RS is quasi-colocated with the SS/PBCH.

Embodiment 47. The UE (200) of any of Embodiments 43-45, wherein receiving the indication comprises receiving (801) a CSI-RS for mobility configuration through system information, SI.

Embodiment 48. The UE (200) of Embodiment 47, wherein receiving the CSI-RS for mobility configuration includes receiving a validity timer.

Embodiment 49. The UE (200) of Embodiment 48, further comprising:
  responsive to receiving the CSI-RS for mobility configuration without a validity timer, receiving (803) an indication whether the configuration is valid for all the time or whether the configuration merely provides the occasions and not the availability of CSI-RS for mobility.

Embodiment 50. The UE (200) of Embodiment 48, further comprising:
  responsive to receiving the CSI-RS for mobility configuration without a validity timer, receiving an indication through L1 signaling of whether the configuration is valid for all the time or whether the configuration merely provides the occasions and not the availability of CSI-RS for mobility.

Embodiment 51. The UE (200) of Embodiment 50 wherein receiving the indication through L1 signaling comprises receiving the indication via an additional bitfield in a paging downlink control information, DCI.

Embodiment 52. The UE (200) of any of Embodiments 47-51, further comprising:
  responsive to receiving the CSI-RS for mobility configuration, determining whether to use CSI-RS for idle mode measurements.

Embodiment 53. The UE (200) of any of Embodiments 43-52, further comprising:
  responsive to the UE being a cell-edge UE, selecting a CSI-RS from a neighboring cell.

Embodiment 54. The method of any of Embodiments 43-52, further comprising:
  responsive to the UE being a cell-edge UE, selecting a CSI-RS from a neighboring cell and a CSI-RS from a camping cell in which the UE is camping.

Embodiment 55. The method of any of Embodiments 43-54, wherein receiving an indication comprises receiving an indication via a bitmap via one of a downlink control information, DCI, or a system information, SI.

Embodiment 56. The method of any of Embodiments 43-55, further comprising:
  receiving (709) a second indication from the network node indicating whether or not the CSI-RS for mobility is transmitted in the CSI-RS for mobility occasion.

Embodiment 57. A user equipment, UE (200) adapted to perform according to any of Embodiments 30-42.

Embodiment 58. A computer program comprising program code to be executed by processing circuitry (203) of a user equipment, UE (200), whereby execution of the program code causes the UE (200) to perform operations according to any of Embodiments 30-42.

Embodiment 59. A computer program product comprising a non-transitory storage medium including program code to be executed by processing circuitry (203) of a user equipment, UE (200), whereby execution of the program code causes the UE (200) to perform operations according to any of Embodiments 30-42.

Explanations are provided below for various abbreviations/acronyms used in the present disclosure.

| Abbreviation | Explanation |
| --- | --- |
| 3GPP | 3rd Generation Partnership Project |
| 5G | 5th Generation |
| BB | Baseband |
| BW | Bandwidth |
| CDRX | Connected mode DRX (i.e. DRX in RRC_CONNECTED state) |
| CRC | Cyclic Redundancy Check |
| CSI | Channel State Information |
| DCI | Downlink Control Information |
| DL | Downlink |
| DMRS | Demodulation Reference Signal |
| DRX | Discontinuous Reception |
| E-SMLC | Evolved-Serving Mobile Location Centre |
| eNB | E-UTRAN NodeB |
| gNB | A radio base station in 5G/NR. |
| GSM | Global System for Mobile communication |
| HARQ | Hybrid Automatic Repeat Request |
| IoT | Internet of Things |
| LO | Local Oscillator |
| LTE | Long Term Evolution |
| MAC | Medium Access Control |
| MCS | Modulation and Coding Scheme |
| MDT | Minimization of Drive Tests |
| MME | Mobility Management Entity |
| mMTC | massive MTC (referring to scenarios with ubiquitously deployed MTC devices) |
| ms | millisecond |
| MTC | Machine Type Communication |
| NB | Narrowband |
| NB-IoT | Narrowband Internet of Things |
| NR | New Radio |
| NW | Network |
| OFDM | Orthogonal Frequency Division Multiplexing |
| OSS | Operations Support System |
| PBCH | Physical Broadcast Channel |
| PDCCH | Physical Downlink Control Channel |
| PDSCH | Physical Downlink Shared Channel |
| RAN | Radio Access Network |
| RAT | Radio Access Technology |
| RF | Radio Frequency |
| RNTI | Radio Network Temporary Identifier |
| RRC | Radio Resource Control |
| RX | Receiver/Reception |
| SIB | System Information Block |
| SON | Self Optimized Network |
| SSB | Synchronization Signal Block |
| T/F | Time/Frequency |
| TX | Transmitter/Transmission |
| TRS | Tracking Reference Signal (or CSI RS for tracking) |
| UE | User Equipment |
| UL | Uplink |
| WU | Wake-up |
| WUG | Wake-up Group |
| WUR | Wake-up Radio/Wake-up Receiver |
| WUS | Wake-up Signal/Wake-up Signaling |

References are identified below.
1. TS38.214-g20-3GPP; Technical Specification Group Radio Access Network; NR; Physical layer procedures for data (Release 16)
2. TS38.331-g20-3GPP; Technical Specification Group Radio Access Network; NR; Radio Resource Control (RRC) protocol specification (Release 16)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
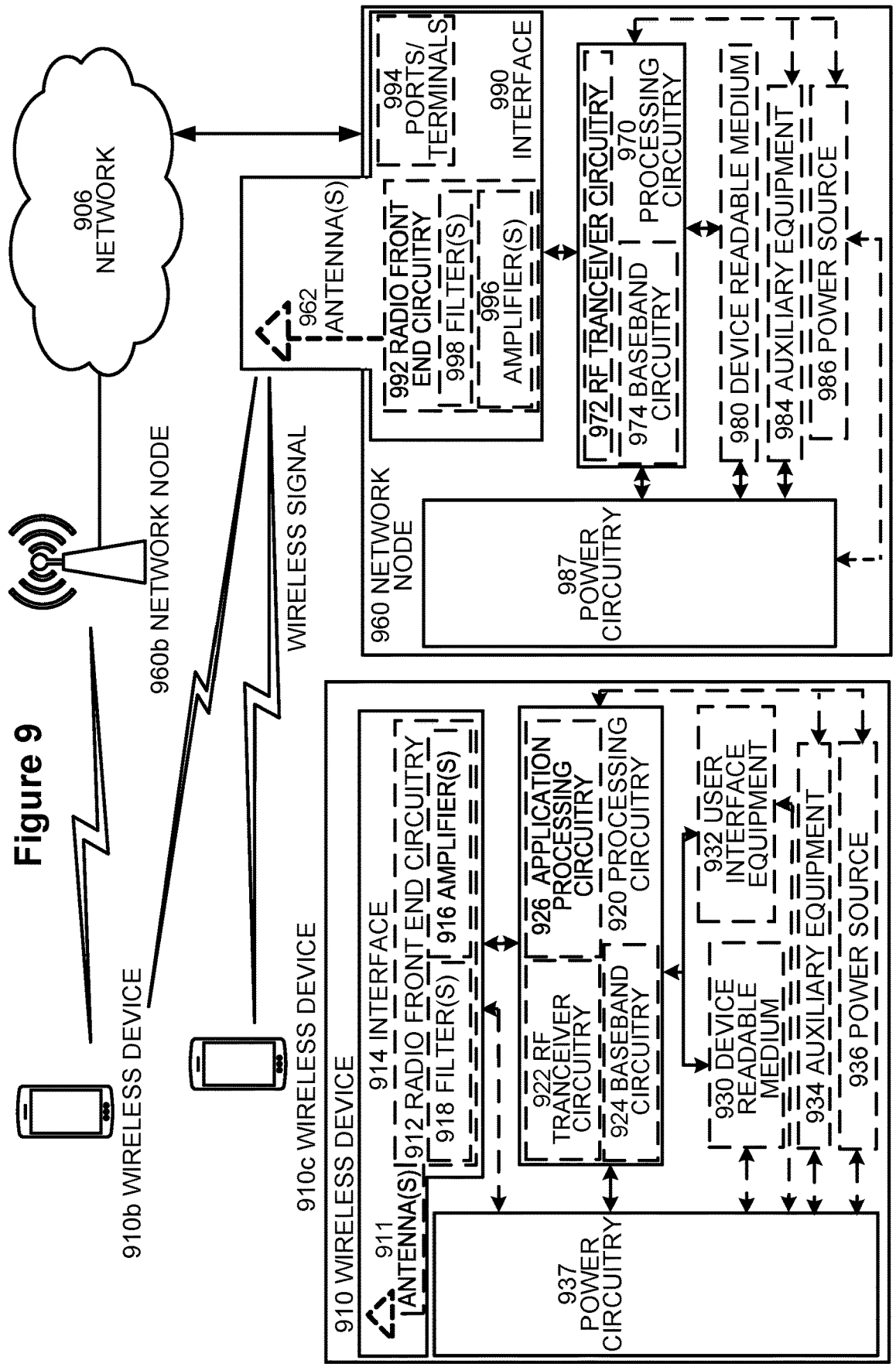
FIG. 9 is a block diagram of a wireless network in accordance with some embodiments.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), operation and maintenance (O&M) nodes, operations support system (OSS) nodes, self-optimized network (SON) nodes, positioning nodes (e.g., evolved-serving mobile location centre E-SMLCs), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 992 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 912 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
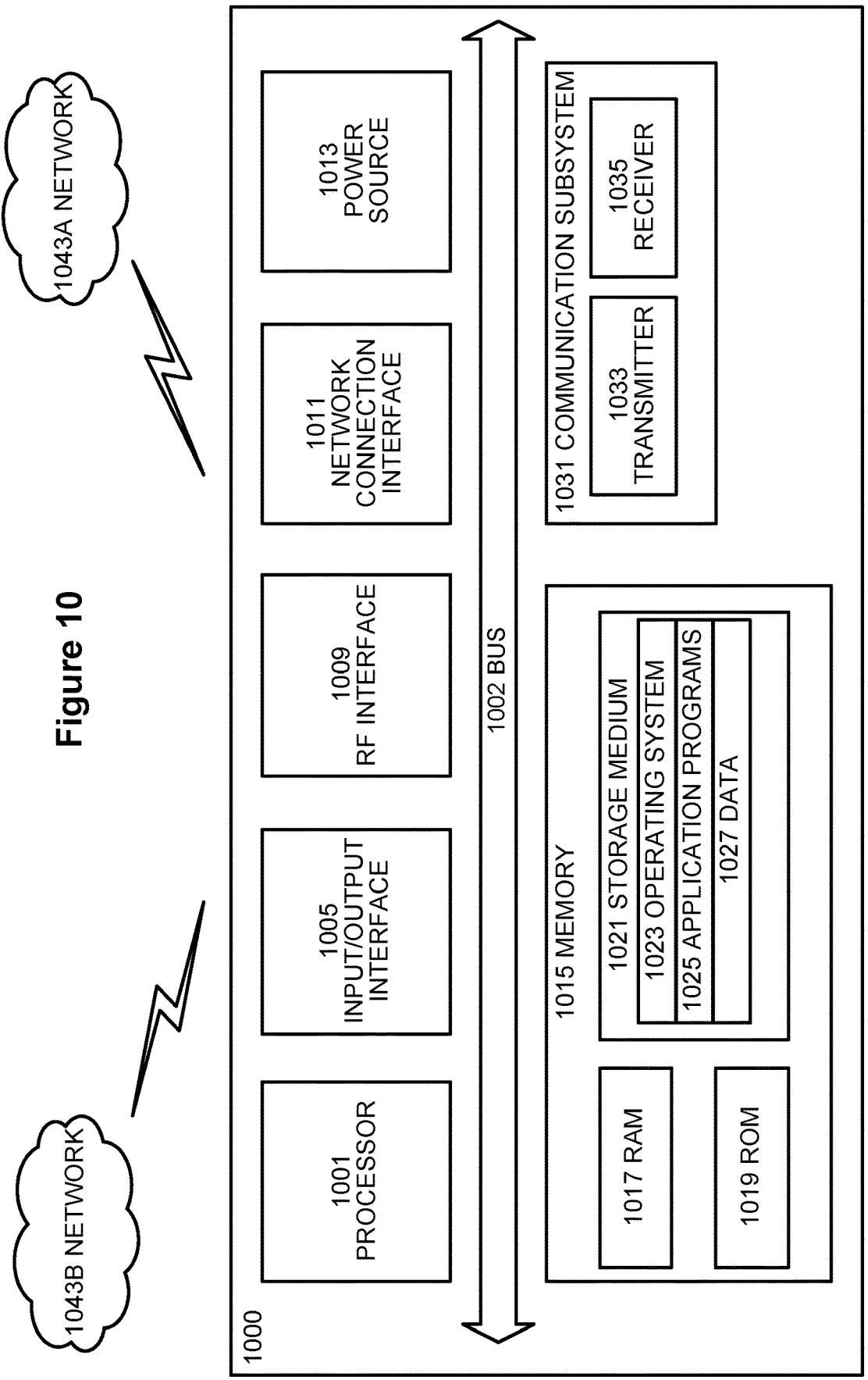
FIG. 10 is a block diagram of a user equipment in accordance with some embodiments

FIG. 10 illustrates a user Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1013, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
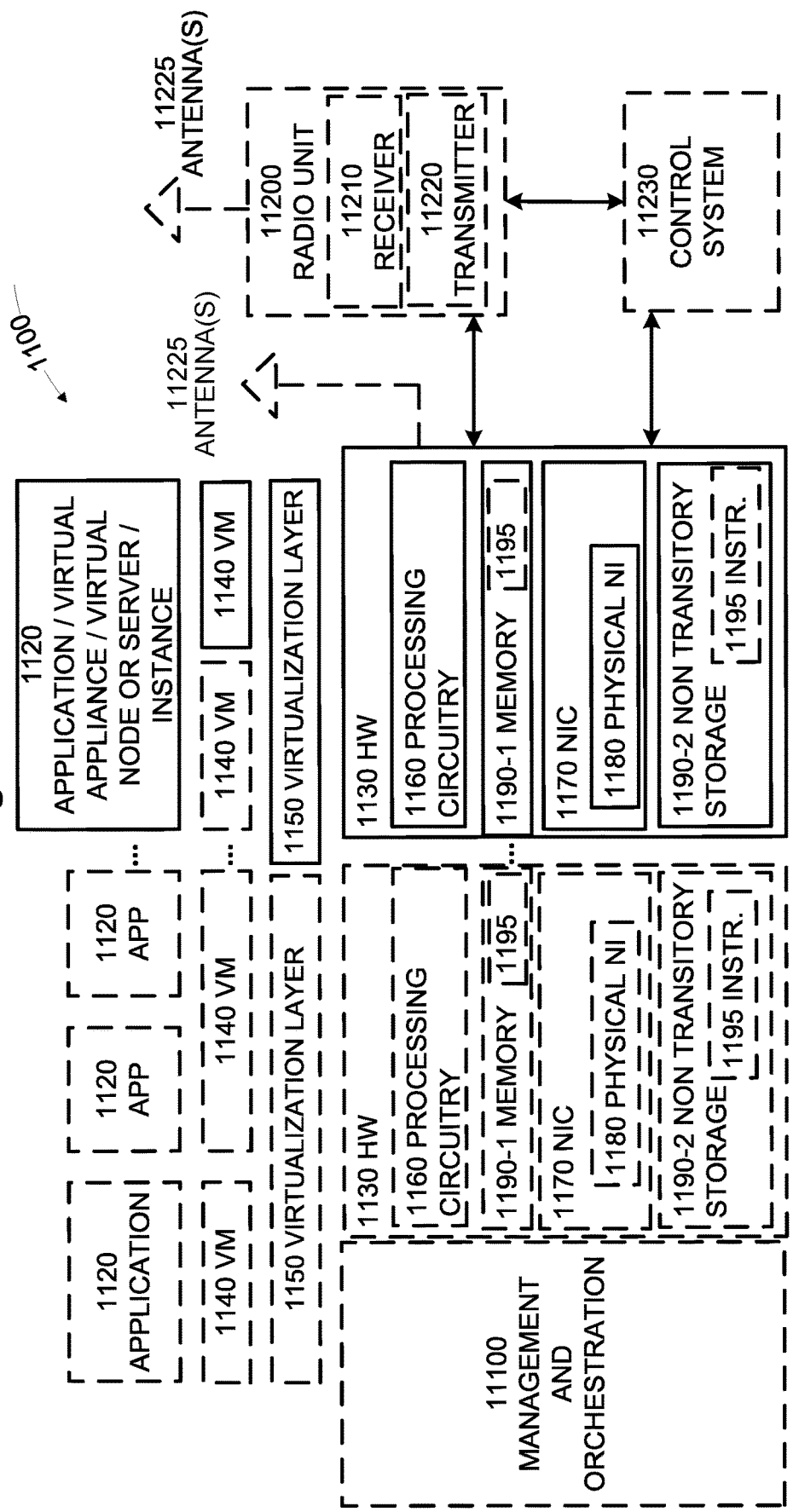
FIG. 11 is a block diagram of a virtualization environment in accordance with some embodiments.

FIG. 11 illustrates a virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140 comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
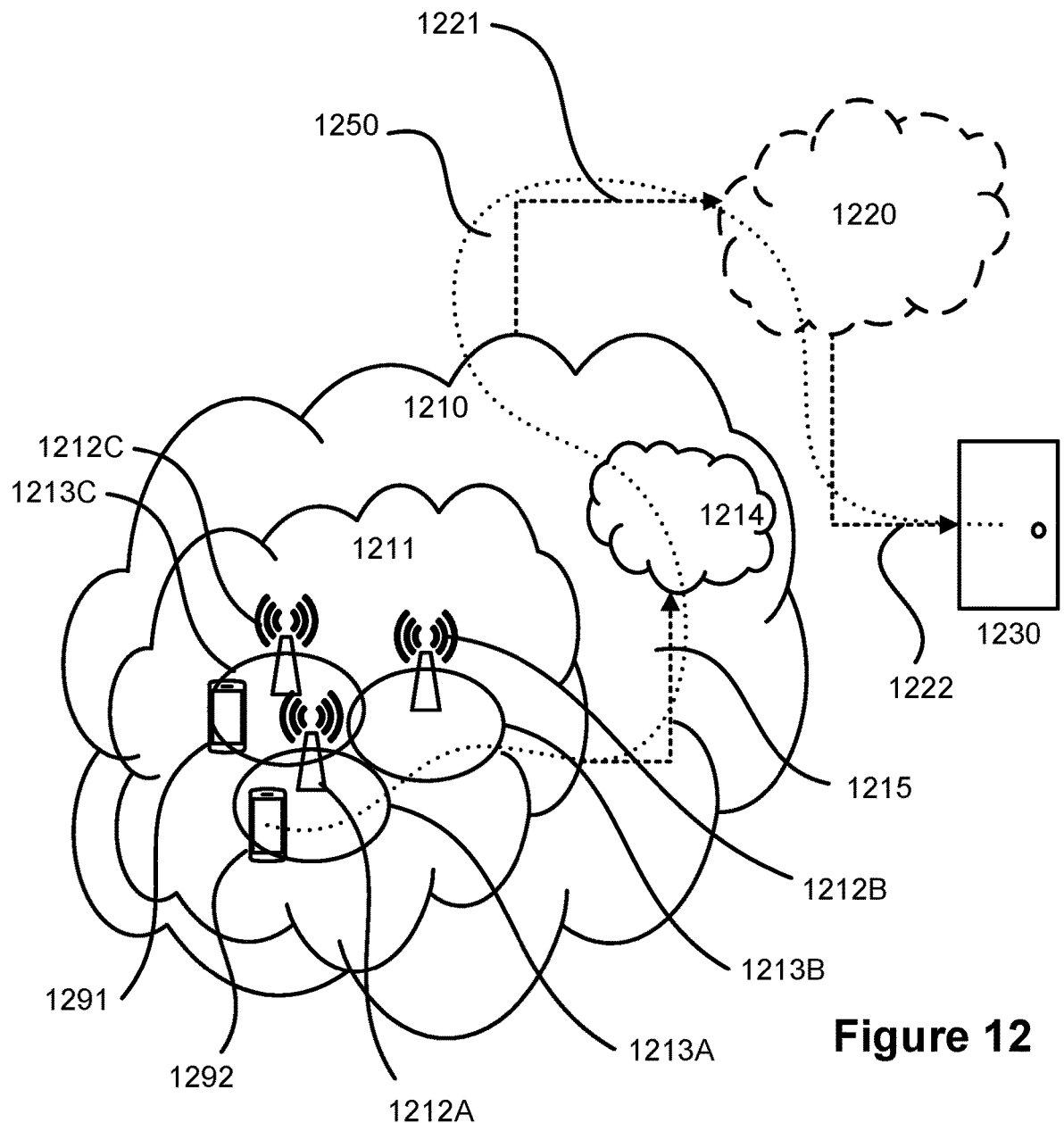
FIG. 12 is a block diagram of a telecommunication network connected via an intermediate network to a host computer in accordance with some embodiments.

FIG. 12 illustrates a telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
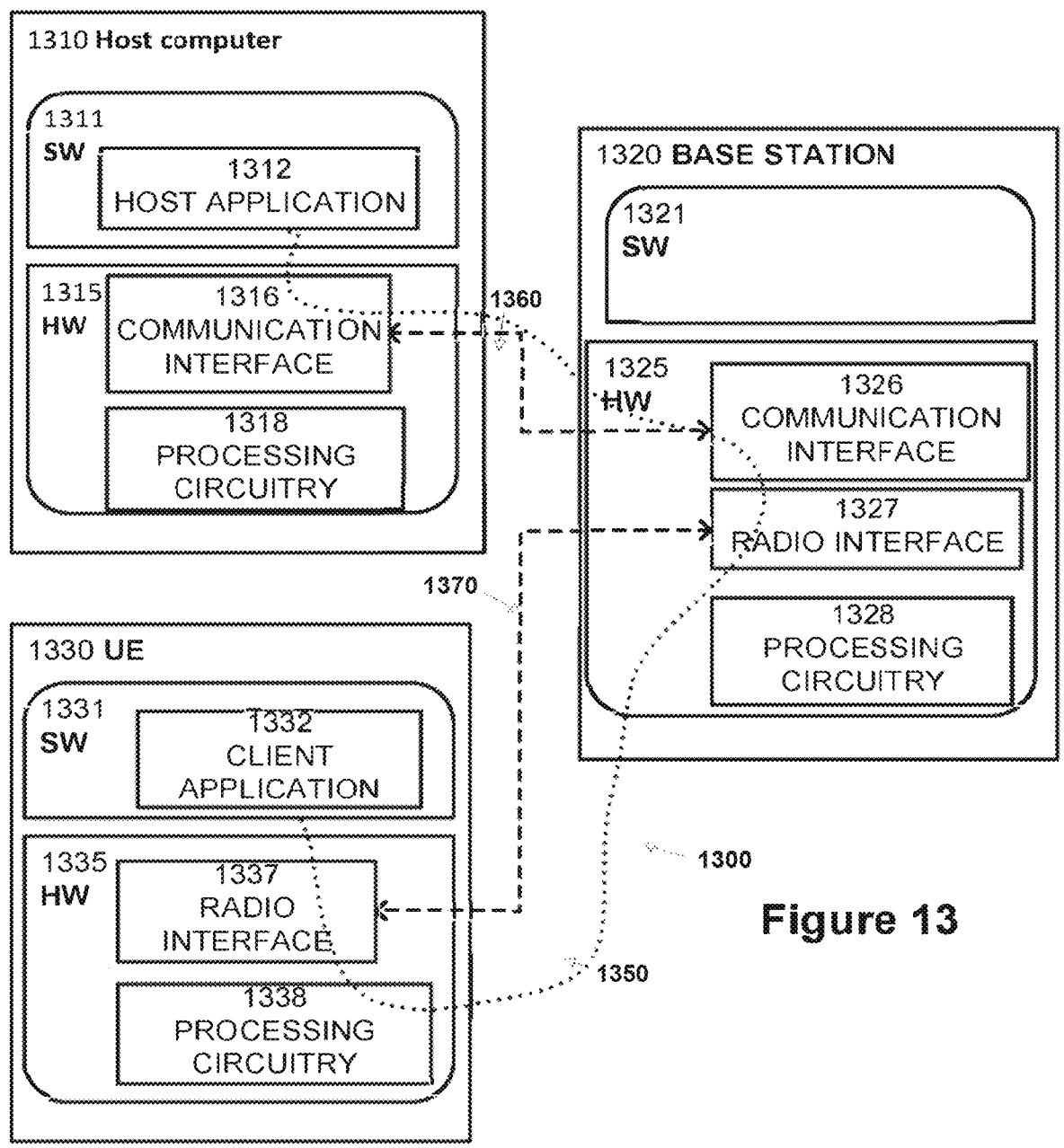
FIG. 13 is a block diagram of a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments may improve the performance of OTT services provided to UE 1330 using OTT connection 1350, in which wireless connection 1370 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
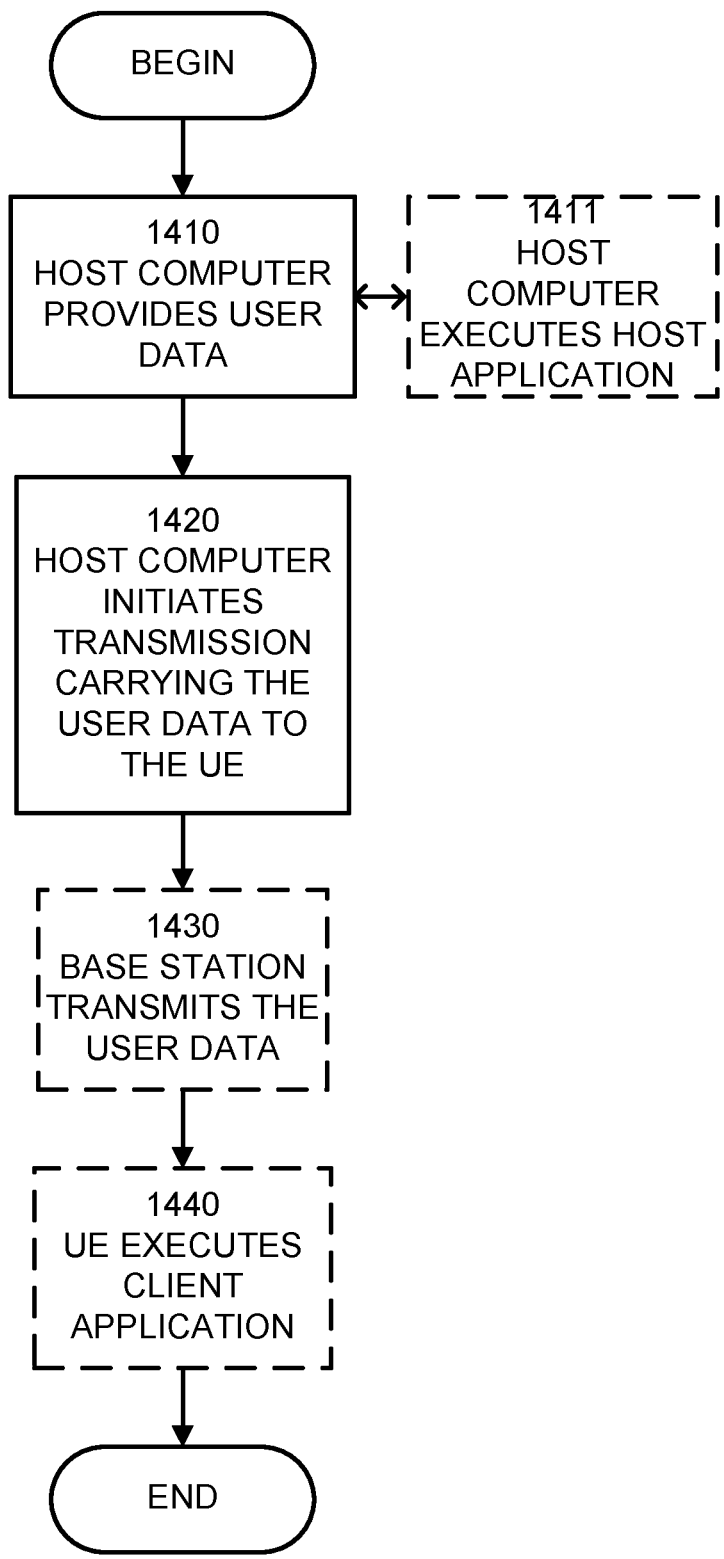
FIG. 14 is a block diagram of methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
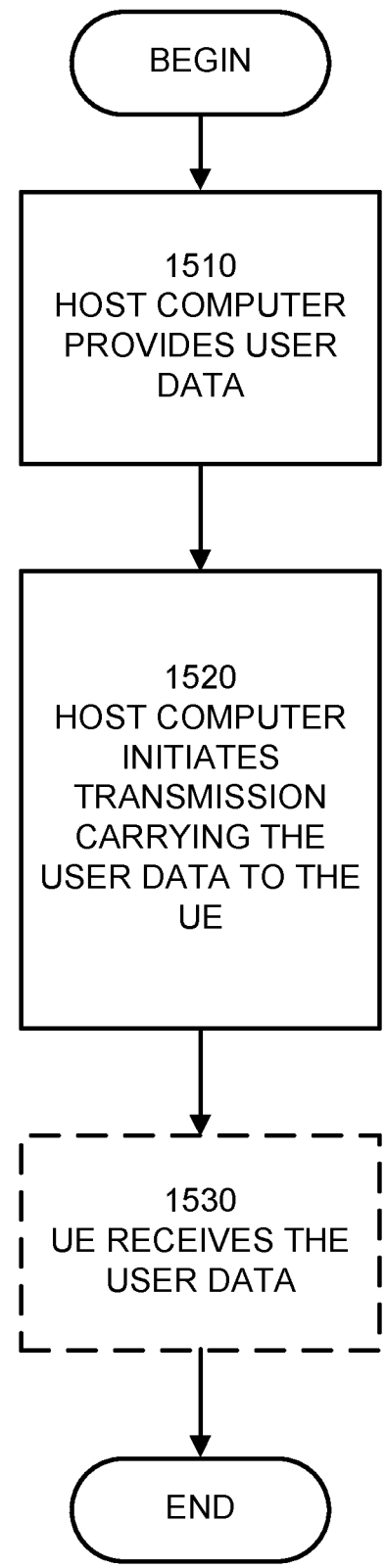
FIG. 15 is a block diagram of methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to Figure will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16 illustrates methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a network node to provide connected mode channel state information-reference signal, CSI-RS, for mobility to an user equipment, UE, while in idle mode, the method comprising:
   providing the UE with an indication that CSI-RS for mobility occasions are available in idle mode based on determining that the UE is transitioning into idle mode, wherein the indication comprises an associated synchronization signal block, associated SSB, field with an associated synchronization signal/physical broadcast channel, SS/PBCH, and indicates in a isQuasiColocated field that the CSI-RS is quasi-colocated with the associated SS/PBCH; and
   transmitting a CSI-RS for mobility occasion to the UE while the UE is in idle mode.

2. The method of claim 1, further comprising configuring the UE to assume connected mode CSI-RS for mobility are available in idle mode.

3. The method of claim 1 further comprising, before determining that the UE is transitioning into idle mode or is in idle mode, receiving an idle mode indication from the UE.

4. The method of claim 1, wherein providing the UE with the indication that CSI-RS for mobility occasions are available in idle mode comprises signaling to the UE through higher layer signaling, wherein the higher layer signaling comprises at least one of system information, SI, radio resource control, RRC, release or dedicated RRC signaling.

5. The method of claim 4 wherein the higher layer signaling comprises at least one of system information, SI, radio resource control, RRC, release or dedicated RRC signaling.

6. The method of claim 4 wherein the indication comprises at least part of a connected mode CSI-RS-ResourceConfigMobility configuration.

7. The method of claim 4, further comprising:
   responsive to providing the indication through system information, SI, providing a validity timer with the indication, and
   adjusting the validity timer in a next SI broadcast.

8. The method of claim 7, further comprising:
   indicating to the UE whether or not the CSI-RS for mobility is transmitted in the CSI-RS for mobility occasion.

9. The method of claim 8, wherein indicating to the UE comprises indicating to the UE via any of L1 signaling, through higher layer signaling, or a specific characteristic in a RS transmitted in idle mode, wherein the L1 signaling comprises any of a paging downlink control information, DCI, a system information, SI, update, or another idle mode DCI, and wherein the specific characteristic in the RS comprises any of a synchronization signal block SSB, tracking reference signal, TRS, or CSI for mobility.

10. A method performed by a user equipment, UE, comprising:
    indicating to the network node that the UE is transitioning into idle mode;
    receiving an indication from a network node that channel state information-reference signal, CSI-RS for mobility occasions are available in idle mode, wherein the indication comprises an associated synchronization signal block, associated SSB, field with an associated synchronization signal/physical broadcast channel, SS/PBCH, and indicates in a isQuasiColocated field that the CSI-RS is quasi-colocated with the associated SS/PBCH; and
    receiving a CSI-RS for mobility occasion while the UE is in idle mode.

11. The method of claim 10 further comprising receiving a configuration to assume connected mode CSI-RS for mobility are available in idle mode.

12. The method of claim 10 wherein indicating to the network node that the UE is transitioning into idle mode or is in idle mode comprises transmitting an idle mode indication to the network node.

13. The method of claim 10, wherein receiving the indication comprises receiving a CSI-RS for mobility configuration through system information, SI, wherein the SI includes receiving a validity timer, or an indication whether the configuration is valid for all the time or whether the configuration merely provides the occasions and not the availability of CSI-RS for mobility.

14. The method of claim 13, further comprising:
    responsive to receiving the CSI-RS for mobility configuration, determining whether to use CSI-RS for idle mode measurements.

15. The method of claim 10, further comprising:
    responsive to the UE being a cell-edge UE, selecting a CSI-RS from a neighboring cell, and/or a CSI-RS from a camping cell in which the UE is camping.

16. The method of claim 10, further comprising:
    receiving a second indication from the network node indicating whether or not the CSI-RS for mobility is transmitted in the CSI-RS for mobility occasion.

17. A radio access network, RAN, node comprising:
    processing circuitry; and
    memory coupled with the processing circuitry, wherein the memory includes instructions that when executed by the processing circuitry causes the RAN node to perform operations according to claim 1.

18. A user equipment, UE comprising:
    processing circuitry; and
    memory coupled with the processing circuitry, wherein the memory includes instructions that when executed by the processing circuitry causes the UE to perform operations according to claim 10.

* * * * *